US010308357B2

(12) United States Patent
Gunter et al.

(10) Patent No.: US 10,308,357 B2
(45) Date of Patent: Jun. 4, 2019

(54) METHODS AND APPARATUS TO CONTROL PITCH AND TWIST OF BLADES

(71) Applicant: The Boeing Company, Chicago, IL (US)

(72) Inventors: Ian M. Gunter, Burien, WA (US); Thomas R. Kenow, Fall City, WA (US); Chris Jorgens, Chicago, IL (US)

(73) Assignee: The Boeing Company, Chicago, IL (US)

( * ) Notice: Subject to any disclaimer, the term of this patent is extended or adjusted under 35 U.S.C. 154(b) by 1286 days.

(21) Appl. No.: 14/502,655

(22) Filed: Sep. 30, 2014

(65) Prior Publication Data
US 2016/0090177 A1 Mar. 31, 2016

(51) Int. Cl.
*B64C 27/72* (2006.01)
*B64C 27/605* (2006.01)
(52) U.S. Cl.
CPC ............ *B64C 27/72* (2013.01); *B64C 27/605* (2013.01); *B64C 2027/7244* (2013.01); *B64C 2027/7255* (2013.01); *Y02T 50/34* (2013.01)
(58) Field of Classification Search
CPC .................. B64C 27/72; B64C 27/605; B64C 2027/7255
USPC ....................................................... 416/147
See application file for complete search history.

(56) References Cited

U.S. PATENT DOCUMENTS

| 2,020,366 | A |   | 11/1935 | MacCallum |
| 2,475,121 | A |   | 7/1949 | Avery |
| 2,584,663 | A |   | 2/1952 | Bensen |
| 3,591,109 | A | * | 7/1971 | McLarty ................. B64C 1/06 244/17.19 |

(Continued)

FOREIGN PATENT DOCUMENTS

GB          2464678          4/2010

OTHER PUBLICATIONS

European Patent Office, "Extended European Search Report," issued in connection with European Patent Application No. 15188930.0, dated May 4, 2016, 9 pages.

(Continued)

*Primary Examiner* — Richard Edgar
*Assistant Examiner* — Michael Sehn
(74) *Attorney, Agent, or Firm* — Hanley, Flight & Zimmerman, LLC

(57) ABSTRACT

Methods and apparatus to control pitch and twist of blades are disclosed. An example apparatus includes a twist input assembly driven by a drive shaft that drives a rotation of blades of a rotorcraft, the twist input assembly comprising a twist shaft, a first gear set driven by the drive shaft, and a first frequency controller to create a first rotational speed difference between a first gear of the first gear set and the drive shaft, the first rotational speed difference to cause the twist shaft to oscillate. The examples apparatus includes a pitch input assembly driven by the drive shaft, the pitch input assembly comprising a pitch link in communication with a first one of the blades of the rotorcraft, a second gear (Continued)

set driven by the drive shaft, and a second frequency controller to create a second rotational speed difference between a second gear of the second gear set and the drive shaft, the second rotational speed difference to cause the pitch link to oscillate.

21 Claims, 13 Drawing Sheets

(56) References Cited

U.S. PATENT DOCUMENTS

| | | |
|---|---|---|
| 4,227,856 A | 10/1980 | Verrill et al. |
| 4,364,708 A | 12/1982 | David |
| 4,573,873 A * | 3/1986 | Yao ............... B64C 27/59 |
| | | 416/114 |
| 4,953,098 A | 8/1990 | Fischer, Jr. et al. |
| 5,242,265 A | 9/1993 | Hora et al. |
| 5,470,199 A | 11/1995 | Schäfer et al. |
| 5,624,232 A | 4/1997 | Certain |
| 6,231,005 B1 | 5/2001 | Costes |
| 7,674,091 B2 | 3/2010 | Zierten |
| 2010/0150702 A1 | 6/2010 | Sheridan et al. |
| 2014/0154074 A1 | 6/2014 | Zientek et al. |
| 2016/0167777 A1 | 6/2016 | Podgurski |

OTHER PUBLICATIONS

U.S. Appl. No. 14/570,709, filed Dec. 15, 2014, 36 pages.
Straub et al., "Application of Higher Harmonic Blade Feathering on the OH-6A Helicopter for Vibration Reduction," 1986, 196 pages, NASA.
United States Patent and Trademark Office, "Non-final Office Action," issued in connection with U.S. Appl. No. 14/570,709, dated Jul. 13, 2017, 45 pages.

* cited by examiner

METHODS AND APPARATUS TO CONTROL PITCH AND TWIST OF BLADES

FIELD OF THE DISCLOSURE

The present disclosure relates generally to aircraft and, more particularly, to methods and apparatus to decouple pitch and twist of blades.

BACKGROUND

Rotorcraft employ one or more blades coupled to a rotor. The rotor drives a rotation of the blades. An ability to manipulate certain characteristics of the blades, such as collective pitch and cyclic pitch, enables an operator to control movement of the rotorcraft.

SUMMARY

An example apparatus includes a drive shaft; a twist shaft to provide input to a blade, the twist shaft being concentric with the drive shaft; and gears to convert rotation of the drive shaft into an oscillation of the twist shaft.

An example apparatus includes a drive shaft; a pitch link to provide input to a blade; and gears to convert rotation of the drive shaft into an oscillation of the pitch link.

An example apparatus includes a twist input assembly driven by a drive shaft that drives a rotation of blades of a rotorcraft, the twist input assembly comprising: a twist shaft; a first gear set driven by the drive shaft; and a first frequency controller to create a first rotational speed difference between a first gear of the first gear set and the drive shaft, the first rotational speed difference to cause the twist shaft to oscillate. The example apparatus includes a pitch input assembly driven by the drive shaft, the pitch input assembly comprising: a pitch link in communication with a first one of the blades of the rotorcraft; a second gear set driven by the drive shaft; and a second frequency controller to create a second rotational speed difference between a second gear of the second gear set and the drive shaft, the second rotational speed difference to cause the pitch link to oscillate.

Another example apparatus includes a first coupling eccentric to a first twist input shaft; a second twist shaft concentric with the first twist shaft, the first coupling to transfer a pitch variation to the intermediate twist shaft; and a second coupling to transfer movement of the intermediate twist shaft to a twist output shaft.

Another example apparatus includes a twist input assembly driven by a drive shaft that drives a rotation of blades of a rotorcraft, the twist input assembly comprising a first frequency controller to create a first rotational speed difference between a first gear of a first gear set and the drive shaft, the first rotational speed difference to cause a twist shaft to oscillate; a pitch input assembly driven by the drive shaft, the pitch input assembly comprising a second frequency controller to create a second rotational speed difference between a second gear of a second gear set and the drive shaft, the second rotational speed difference to cause a pitch link to oscillate; and a mixing assembly coupled to the twist shaft and the pitch link, the mixing assembly to maintain a twist of the blades during a pitch variation of the blades.

An example method includes reducing, by a first amount, a first rotational speed of a first gear in communication with a second gear to cause a twist shaft oscillation having a first frequency, wherein a difference between a second rotational speed of the second gear and a third rotational speed of a drive shaft causes the twist shaft oscillation; and reducing, by a second amount different than the first amount, the first rotational speed of the first gear to cause the twist shaft oscillation to have a second frequency different than the first frequency.

Another example method includes reducing, by a first amount, a first rotational speed of a first gear in communication with a second gear to cause a pitch link oscillation having a first frequency, wherein a difference between a second rotational speed of the second gear and a third rotational speed of a drive shaft causes the pitch link oscillation; and reducing, by a second amount different than the first amount, the first rotational speed of the first gear to cause the pitch link oscillation to have a second frequency different than the first frequency.

The features, functions and advantages that have been discussed can be achieved independently in various embodiments or may be combined in yet other embodiments further details of which can be seen with reference to the following description and drawings.

Figure 1:
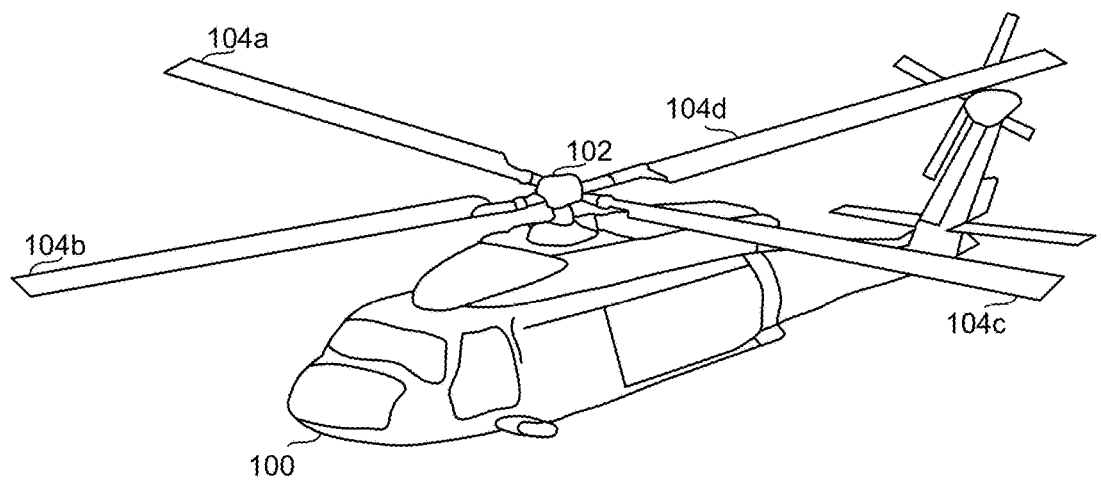
FIG. 1 is an illustration of an example rotorcraft in which teachings of this disclosure may be implemented.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. As used herein, the terms "coupled" and "operatively coupled" are defined as connected directly or indirectly (e.g., through one or more intervening structures and/or layers). Stating that any part is in contact with another part means that there is no intermediate part between the two parts.

DESCRIPTION

FIG. 1 shows an example machine in which example methods and apparatus disclosed herein may be utilized. While example methods and apparatus disclosed herein are described in connection with FIG. 1, examples disclosed herein may be implemented in connection with any type of machine or device having rotor blades, such as aircraft, watercraft, hovercraft, wind turbines, etc. FIG. 1 shows a helicopter 100 having a rotor system 102 that drives a plurality of rotor blades 104. The rotor system 102 spins the blades 104 to provide the helicopter 100 with lift and thrust. As the blades 104 spin through air, each one of the blades 104 rotates along a tracking path or plane of rotation. The amount of lift and/or thrust provided by each of the blades 104 and the tracking path traveled by each of the blades 104 depends on a plurality of aerodynamic characteristics of the respective blade. For example, each of the blades 104 has a particular airfoil, a pitching moment, a weight distribution, a twist, a chord length, etc.

An operator of the helicopter 100 manipulates the blades 104 via controls in communication with the rotor system 102. For example, the operator uses a collective input to control an altitude of the helicopter 100. The collective input simultaneously changes an angle of attack or pitch of each blade a same or equal amount. Additionally, the operator uses a cyclic input to control lateral movement (e.g., left, right, forward, aft) of the helicopter 100. The cyclic input changes the angle of attack or pitch of each blade as a function of position during a revolution relative to, for example, an airframe. The example rotor system 102 of FIG. 1 includes a swashplate in communication with the collective and cyclic inputs to implement the changes in angle of attack or pitch. The example rotor system of FIG. 1 includes links (e.g., rods and/or pins) extending from the swashplate to the blades 104 to implement the controls. For collective inputs, the swashplate is raised or lowered to such that the each of the links alters the pitch of the corresponding blade 104 a same amount. For cyclic inputs, the swashplate is tilted such that the links alter the pitch of the corresponding blades 104 as a function of a position in a rotation. That is, as the blades 104 rotate, the cyclic input alters respective ones of the blades 104 based on where the blades 104 are in the rotation.

Additionally, twisting the blades 104 (e.g., statically during a certain type of flight such as take-off, landing, or cruise or multiple times per revolution) can reduce vibration, reduce noise and/or, more generally, increase performance. Twisting the blade 104 typically involves fixing a first end of a torsion shaft at a tip of the blade 104 and applying torque to a second end of the torsion shaft at a root of the blade 104. Thus, twisting the blade 104 alters the blade 104 from a baseline airfoil to a modified airfoil. The operator of the helicopter 100 may desire the modified airfoil of the blade 104 to, for example, more evenly distribute lift across the corresponding blade 104 during certain conditions and/or operating modes.

Example methods and apparatus disclosed herein recognize that in known systems the modified airfoil of a twisted blade 104 may not be maintained when that same blade 104 is pitched (e.g., in response to collective and/or cyclic inputs). That is, in such known systems, when the blade 104 is twisted to attain a particular modified airfoil, pitching the twisted blade 104 causes the particular modified airfoil to be distorted (e.g., different than the intended airfoil attained via the twist). For example, when the blade 104 in known systems is forwardly pitched about a pitching moment, the twist of the blade 104 and the corresponding modified airfoil of the blade 104 are not preserved as the blade 104 pitches forward. Thus, in known systems, the twist of the blade 104 may be undesirably influenced when the blade 104 is pitched.

Examples disclosed herein insulate the twist of the blade 104 from potentially undesirable effects of pitch controls. As described in detail below, examples disclosed herein include a pitch shaft, a twist input concentric with the pitch shaft, and a set of gears coupling the pitch shaft and the twist input shaft to enable the twist (if any) of the blade 104 to remain constant as the blade 104 is pitched. In particular, examples disclosed herein convert, via the set of gears, rotational motion of the pitch shaft into rotational motion of the twist input shaft. With the conversion or transfer of the rotational motion provided by examples disclosed herein in place, variations in pitch cause a commensurate and compensating variation in twist. Thus, if the blade 104 is twisted to attain a modified airfoil and the blade 104 is pitched, examples disclosed herein maintain the twist (and, thus, the corresponding modified airfoil) of the blade 104 as the blade 104 is pitched. Examples disclosed herein to maintain the twist of the blade 104 in response to pitch variations are described below in connection with FIGS. 7-12.

Additional example methods and apparatus disclosed herein provide inputs to pitch mechanisms and twist mechanisms such as, for example, the twist-maintaining examples described in detail below in connection with FIGS. 7-12. In particular, examples disclosed herein include a pitch input assembly and a twist input assembly. The example pitch input assembly disclosed herein converts a rotational force provided by a main drive shaft into a vertical oscillation to be used in the pitching of the blades. The example pitch input assembly disclosed herein controls a frequency of the pitch input via, for example, a brake. Use of the brake by examples disclosed herein enables control of the oscillation frequency without a need for an additional power source. Further, the example pitch input assembly disclosed herein utilizes a phase input to control a phase of the pitch input.

The example twist input assembly disclosed herein converts the rotational force provided by the main drive shaft into a rotational oscillation to be used in the twisting of the blades. The example twist input assembly disclosed herein controls a frequency of the twist input via, for example, a brake. Use of the brake by examples disclosed herein enables control of the oscillation frequency without a need for an additional power source. Further, the example twist input assembly disclosed herein utilizes a phase input to control a phase of the twist input. Together, the pitch input assembly and the twist input assembly enable high speed pitch variation and high speed twist variation with corresponding phase and frequency control. Examples of the pitch input assembly and the twist input assembly are described below in connection with FIGS. 2-6.

While the examples of FIGS. 2-6 are described below in conjunction with the examples of FIGS. 7-12, example drive assemblies disclosed herein may be implemented in connection with any suitable rotorcraft employing additional or alternative twist and/or pitch mechanisms and/or techniques. Further, while the examples of FIGS. 2-6 are described below in conjunction with the examples of FIGS. 7-12, the examples disclosed herein to maintain twist in response to pitch variations may be implemented in connection with any suitable rotorcraft employing additional or alternative drive assemblies.

Figure 2:
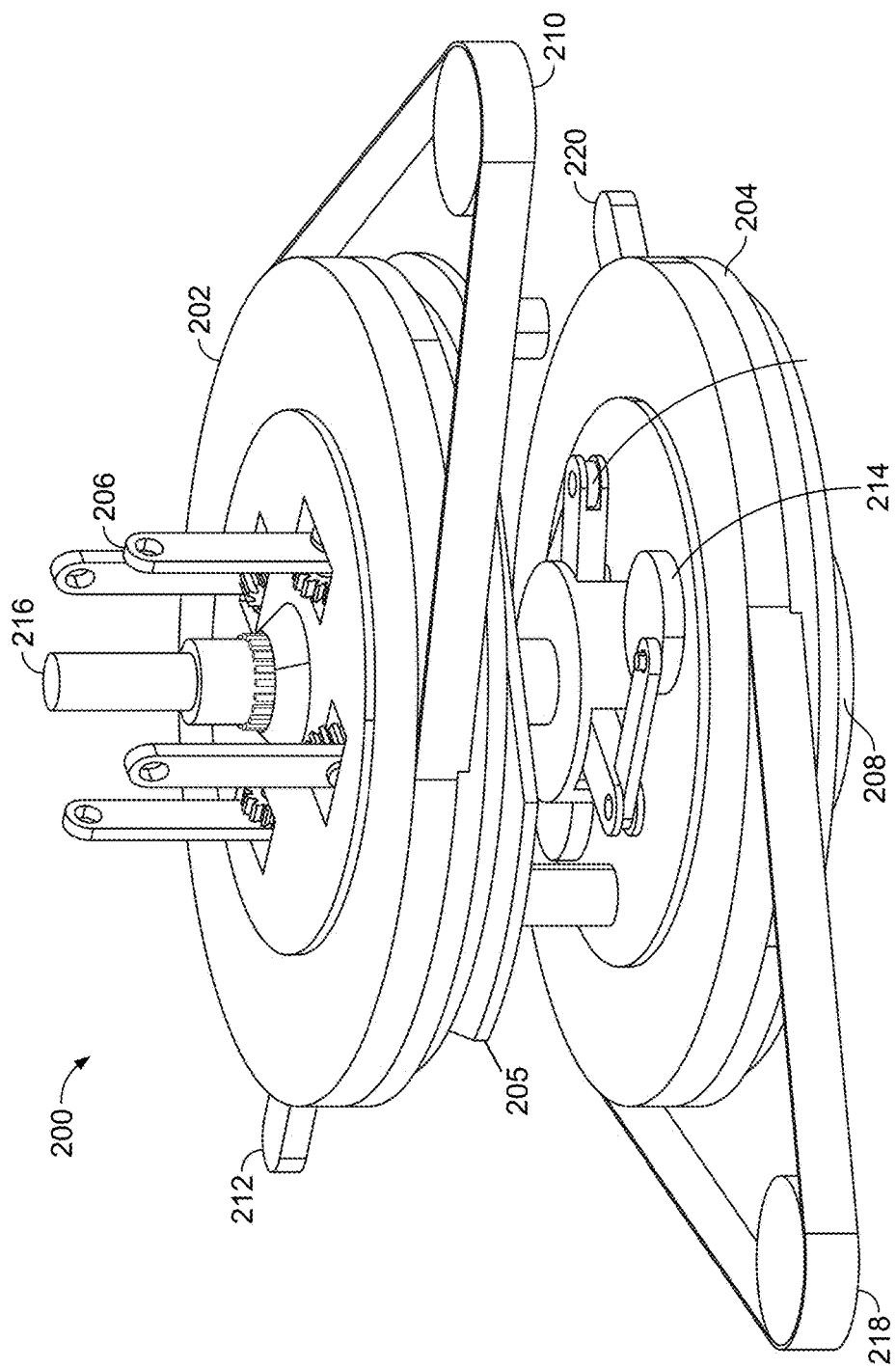
FIG. 2 depicts an example control assembly constructed in accordance with teachings of this disclosure.

FIG. 2 depicts an example control assembly 200 constructed in accordance with teachings of this disclosure. The example control assembly 200 of FIG. 2 includes a pitch input assembly 202 and a twist input assembly 204. The example control assembly 200 of FIG. 2 receives commands such as, for example, collective control signals and cyclic control signals from, for example, an operator of a helicopter. The collective and cyclic control signals cause the pitch input assembly 202 to move up and down via, for example, one or more hydraulics or other type of actuator (not shown). The example pitch input assembly 202 of FIG. 2 serves as a swashplate in that one or more actuators (e.g., hydraulics) move the example pitch input assembly 202 up and down relative to, for example, a fixed swashplate component 205. Accordingly, in conjunction with the fixed swashplate component 205 and the actuators that receive commands (e.g., collective and cyclic commands) from the operator, the example pitch input assembly 202 to enable the craft to pitch, roll, and/or translate. As described above, the collective control signals adjust a pitch of each blade similarly, while the cyclic control signals adjust pitch of the different blades differently depending on the blade position in the rotation. The example pitch input assembly 202 of FIG. 2 includes a plurality of pitch links 206, each of which is coupled to a blade so that movement of the respective pitch link 206 changes a pitch of the corresponding blade. For example, upward movement of the pitch links 206 pitches the blades forward about a pitching moment, while downward movement of the pitch links 206 pitches the blades rearward about the pitching moment.

As described in detail below, the example pitch input assembly 202 converts rotational movement of a main drive shaft 208 into an oscillation for the pitch links 206. Further, as described in detail below, the example pitch input assembly 202 includes a pitch oscillation frequency controller 210 to control a frequency of the oscillation of the pitch links 206. Further, as described below, the example pitch input assembly 202 includes a pitch oscillation phase controller 212 to control a phase of the oscillation of the pitch links 206.

The example twist input assembly 204 of FIG. 2 includes a plurality of eccentric drives 214, each of which is coupled to a twist shaft 216. The twist shaft 216 provides input to a twist mechanism, such as an example pitch-twist mixing (PTM) assembly of FIGS. 7-12. As described in detail below, the example twist input assembly 204 converts rotational movement of the main drive shaft 208 into an oscillation for the twist shaft 216. Further, as described in detail below, the example twist input assembly 204 includes a twist oscillation frequency controller 218 to control a frequency of the oscillation of the twist shaft 216. Further, as described in detail below, the example twist input assembly 204 includes a twist oscillation phase controller 220 to control a phase of the oscillation of the twist shaft 216.

Figure 3:
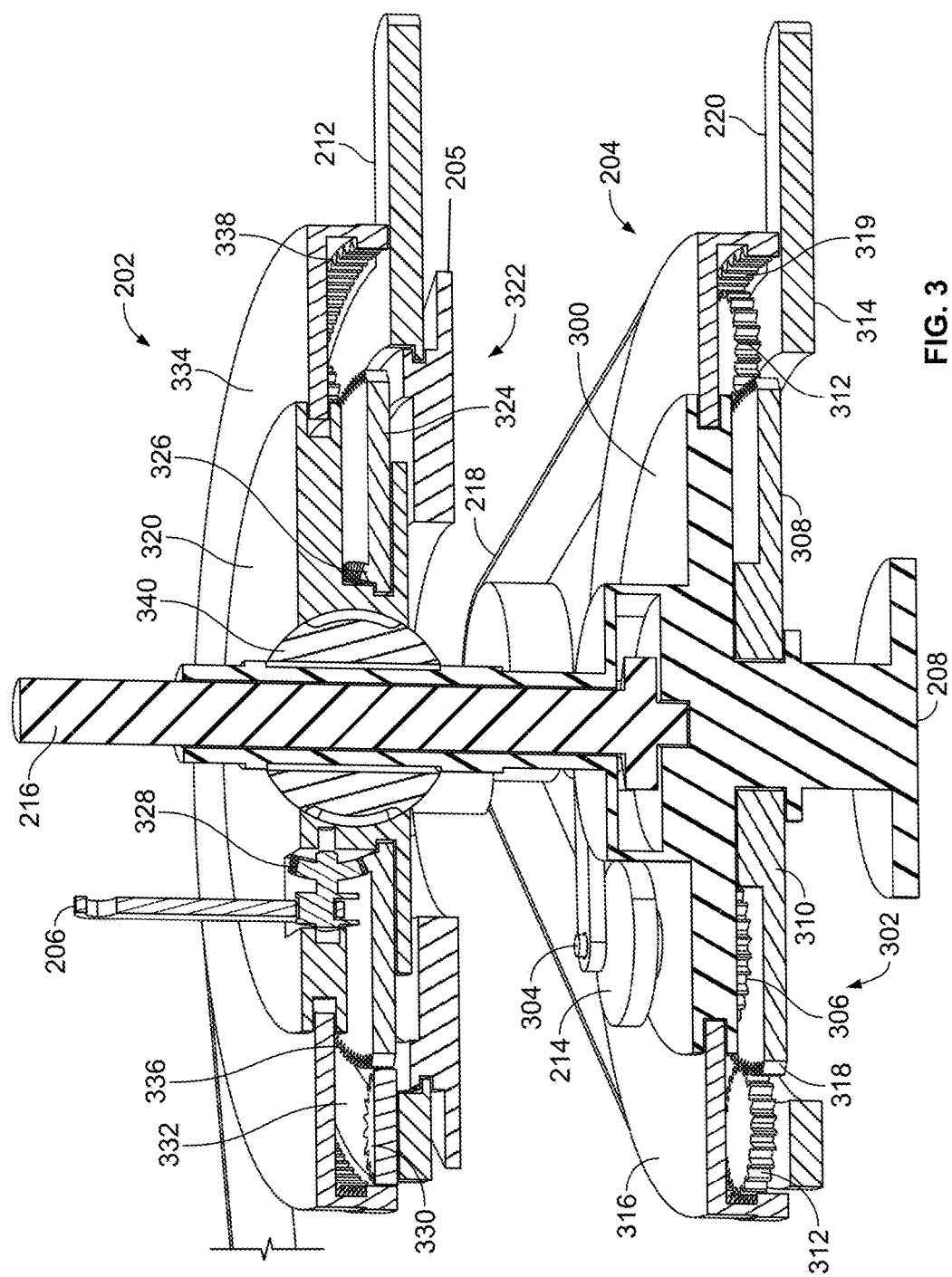
FIG. 3 is a partial sectional view of the example control assembly of FIG. 2 including a pitch input assembly and a twist input assembly from a first perspective.

FIG. 3 is a cross sectional view of the control assembly 200 including the pitch input assembly 202 and the twist input assembly 204. The main drive shaft 208 is powered by a motor to drive rotation of the blades. The example twist input assembly 204 includes a disc-shaped extension 300 of the main drive shaft 208 that rotates with the main drive shaft 208. In the illustrated example of FIG. 3, the disc-shaped extension 300 is integrally formed with the main drive shaft 208. The example twist input assembly 204 includes a gear set 302 to convert power from the main drive shaft 208 into an oscillation of the twist shaft 216. To introduce the power from the main drive shaft 208 to the gear set 302, the eccentric drives 214 (only one of which is shown in FIG. 3) ride on the disc-shaped extension 300 of the main drive shaft 208 and, thus, rotate about a longitudinal axis of the main drive shaft 208 as the main drive shaft 208 spins. In the illustrated example, each of the eccentric drives 214 includes a shaft 304 that spins about a center of the corresponding eccentric drive 214. The rotation of the shaft 304 about the center of the corresponding eccentric drive 214 is discussed below in connection with FIG. 4. Further, each of the eccentric drives 214 includes a coupling (e.g., a shaft or arm) that extends through the disc-shaped extension 300 of the main drive shaft 208 and terminates in a bottom gear 306 mounted to a stepped gear 308 that is concentric with the main drive shaft 208. That is, each of the eccentric drives 214 is coupled to the stepped gear 308 such that a rotation of the stepped gear about the longitudinal axis of the main drive shaft 208 is driven by the main drive shaft 208. Thus, as the main drive shaft 208 rotates about its longitudinal axis, the eccentric drives 214 rotate about the same longitudinal axis, and the stepped gear 308 rotates about the same longitudinal axis. Put another way, the main drive shaft 208 drives a rotation of the eccentric drives 214 about the twist shaft 216 and transfers power to the stepped gear 308 of the eccentric drives 214.

In the example of FIG. 3, the stepped gear 308 includes raised teeth 310 that interface with the bottom gear 306. Notably, when the rotational speed of the stepped gear 308 and the rotational speed of the disc-shaped extension 300 of the main drive shaft 208 are substantially equal, the bottom gear 306 does not spin about a center of the eccentric drive 214. In particular, when the bottom gear 306 travels around the longitudinal axis of the main drive shaft 208 at a same rate as the raised teeth 310, the raised teeth 310 do not cause the bottom gear 306 to spin about the center of the eccentric drive 214. In contrast, when the rotational speed of the stepped gear 308 and the rotational speed of the disc-shaped extension 300 of the main drive shaft 208 are different, the raised teeth 310 of the stepped gear 308 rotationally progress through the teeth of the bottom gear 306, thereby causing the eccentric drive 214 to spin about its center axis. To cause and control the difference in rotational speed between the disc-shaped extension 300 of the main drive shaft 208 and the stepped gear 308, the example gear set 302 of FIG. 3 includes a plurality of planet gears 312, which are mounted to a ring 314, and an outer gear 316 in communication with the example twist oscillation frequency controller 218. In the illustrated example, the ring 314 is coupled to an airframe and does not rotate about the main drive shaft 208 in a continuous manner. However, as described below in connection with FIG. 5, the rotational position of the ring 314 relative to a reference can be altered (e.g., by a certain degree) to alter an oscillation phase. The stepped gear 308 includes outer teeth 318 that interface with the planet gears 312. The planet gears 312 also interface with internal teeth 319 of the outer gear 316. Thus, as the main drive shaft 208 rotates about its longitudinal axis, the gear set 302 causes the stepped gear 308 and the outer gear 316 to rotate about the longitudinal axis of the main drive shaft 208.

The outer gear 316 is variably slowed by the example twist oscillation frequency controller 218 to introduce a difference in rotational speed between the stepped gear 308 and the disc-shaped extension 300 of the main drive shaft 208. In the illustrated example of FIG. 3, the twist oscillation frequency controller 218 is a brake capable of variably slowing down the rotation of the outer gear 316. The example twist oscillation frequency controller 218 is implemented by any suitable variable braking mechanism such as, for example, a hydraulic re-circulating pump with a needle valve. When the twist oscillation frequency controller 218 brakes the outer gear 316, the rotational speed of the planet gears 312 and, thus, the stepped gear 308, is reduced. This difference in rotational speed between the stepped gear 308 and the disc-shaped extension 300 introduced by the twist oscillation frequency controller 218 causes the raised teeth 310 of the stepped gear 308 to rotate the bottom gear 306 around the center axis of the eccentric drive 214. As the bottom gear 306 rotates about its axis, the eccentric drive 214 rotates about its center axis. Thus, the speed of rotation of the eccentric drive 214 is controlled by the example twist oscillation frequency controller 218 and the corresponding amount of braking applied to the outer gear 316.

Figure 4:
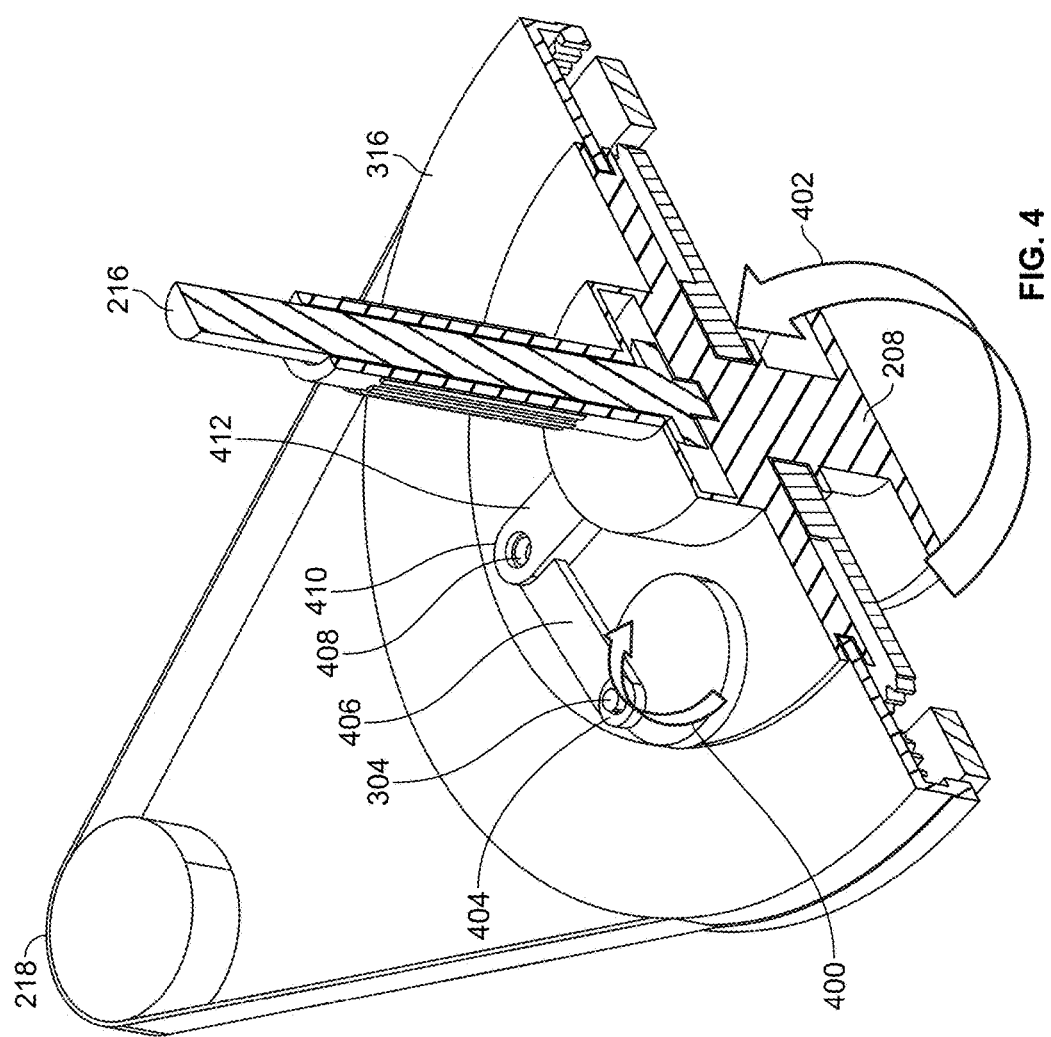
FIG. 4 is a partial sectional view of the twist input assembly of FIGS. 2 and 3 from a second perspective.

FIG. 4 illustrates an example rotation 400 of the eccentric drives 214 (only one of which is shown in FIG. 4) about the respective axes of the eccentric drives 214, as well as a corresponding a rotation 402 of the main drive shaft 208 about its longitudinal axis. In the example of FIG. 4, when the rotation 402 of the main drive shaft 208 (and, thus, the stepped gear 308 and the outer gear 316 of the gear set 302) is counterclockwise and when the twist oscillation frequency controller 218 creates a speed differential between the stepped gear 308 and the disc-shaped extension 300 of the main drive shaft 208, the rotation 400 of the eccentric drives 214 is counter clockwise. Thus, as the eccentric drives 214 travel around the longitudinal axis of the main drive shaft 208, the eccentric drives 214 rotate about their respective centers when the twist oscillation frequency controller 218 creates a speed differential between the stepped gear 308 and the disc-shaped extension 300 of the main drive shaft 208. As shown in FIG. 4, a first end 404 of a first arm 406 is pivotably coupled to the shaft 304 of the eccentric drive 214, which is offset from the center of the eccentric drive 214. A second end 408 of the first arm 406 is pivotably coupled to a first end 410 of a second arm 412. A second end (not visible in FIG. 4) of the second arm 412 is rigidly coupled to the twist shaft 216. Accordingly, as the eccentric drive 214 travels around the main drive shaft 208, the twist shaft 216 rotates about the longitudinal axis of the twist shaft 216. Further, if the eccentric drive 214 is rotating about its center axis, the first and second arms 406, 412 cause the twist shaft 216 to oscillate. In particular, as the shaft 304 of the eccentric drive 214 travels around the center of the eccentric drive 214, the shaft 304 pushes and pulls the first arm 406 toward and away from the second arm 412. As such, the second arm 412 oscillates. Because the second arm 412 is rigidly coupled to the twist shaft 216, the twist shaft 216 oscillates in accordance with the rotation of the eccentric drive 214 about the center axis of the eccentric drive 214. As described above, the rotational speed of the eccentric drive 214 about its center axis is controlled by the example twist oscillation frequency controller 218 (e.g., by braking the outer gear 316). Thus, the oscillation frequency of the twist shaft 216 is controlled by the example twist oscillation frequency controller 218. Notably, the example twist oscillation frequency controller 218 and, more generally, the example twist input assembly 204, are able to control the oscillation of the twist shaft 216 using a variable brake rather than requiring an additional power source and the accompanying costs (e.g., monetary, weight, complexity, etc.).

Figure 5:
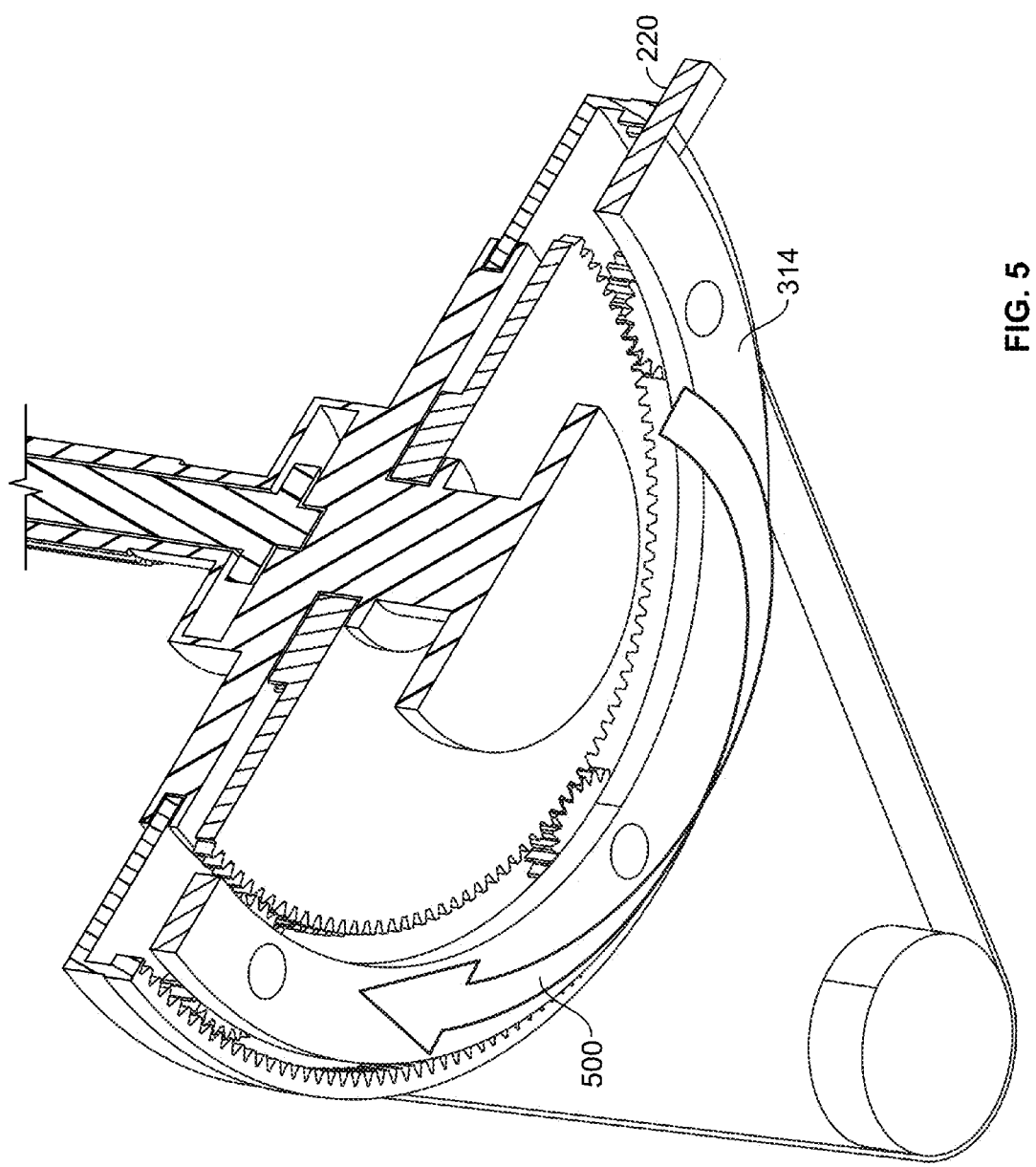
FIG. 5 is a partial sectional view of the twist input assembly of FIGS. 2-4 from a third perspective.

FIG. 5 is a different view of the example twist input assembly 204 to illustrate a phase control provided by the example twist oscillation phase controller 220 of FIGS. 2 and 3. In particular, the example twist oscillation phase controller 220 rotates the example ring 314 to which the planet gears 312 are mounted. The example twist oscillation phase controller 220 can be driven by any suitable actuator (e.g., a hydraulic actuator in communication with controls operated by a helicopter operator) to rotate the example ring 314 a desired amount (e.g., degree) to alter the phase of the oscillation of the twist shaft 216. As the stepped gear 308 rotates, a phase of the rotation of the stepped gear 308 can be shifted by rotating the example ring 314 in a direction 500 shown in FIG. 5. For example, as the stepped gear 308 is rotating, the example twist oscillation phase controller 220 can rotate the ring 314 by a first number of degrees to offset the phase of the stepped gear 308 and, thus, the oscillation of the twist shaft 216 by a second number of degrees. The ratio of the first number of degress to the second number of degrees depends on a gear ratio and can be set according to, for example, design preferences. The example twist oscillation phase controller 220 can be rotated back to an original position to eliminate the phase shift.

Referring back to FIG. 3, the example pitch input assembly 202 transfers power from the main drive shaft 208 in a similar manner as the twist input assembly 204. In particular, the example pitch input assembly 202 includes a disc-shaped extension 320 of the main drive shaft 208 that rotates with the main drive shaft 208. In the illustrated example of FIG. 3, the disc-shaped extension 320 is is connected to the drive shaft 208 by a CV joint and a splined segment allowing pitch and/or roll, as well as translation. The example pitch input assembly 202 includes a gear set 322 to convert power from the main drive shaft 208 into an oscillation of the pitch links 206, only one of which is shown in FIG. 3 for purposes of clarity. To introduce the power from the main drive shaft 208 to the gear set 322, the disc-shaped extension 320 of the main drive shaft 208 is coupled to a stepped gear 324 concentric with the main drive shaft 208 such that the stepped gear 324 rotates about a longitudinal axis of the main drive shaft 208 as the main drive shaft 208 spins. In the illustrated example, each of the pitch links 206 rides on the stepped gear 324 and travels around the main drive shaft 208. Thus, as the main drive shaft 208 rotates about its longitudinal axis, the pitch links 206 rotate about the same longitudinal axis, and the stepped gear 324 rotates about the same longitudinal axis.

In the example of FIG. 3, the stepped gear 324 of the pitch input assembly 202 includes angled teeth 326 that interface with vertical gears 328 of the pitch links 206. Notably, when the rotational speed of the stepped gear 324 and the rotational speed of the disc-shaped extension 320 of the main drive shaft 208 are substantially equal, the vertical gear 328 does not spin about a center of the vertical gear 328. In particular, when the vertical gear 328 travels around the longitudinal axis of the main drive shaft 208 at a same rate as the angled teeth 326, the angled teeth 326 do not cause the vertical gear 328 to spin about its center. In contrast, when the rotational speed of the stepped gear 324 and the rotational speed of the disc-shaped extension 320 of the main drive shaft 208 are different, the angled teeth 326 of the stepped gear 308 rotationally progress through the teeth of the vertical gear 328, thereby causing the vertical gear 328 to spin about its center axis. Rotation of the vertical gear 328 about its center axis causes the corresponding pitch link 206 to oscillate up and down.

To cause the difference in rotational speed between the disc-shaped extension 320 of the main drive shaft 208 and the stepped gear 324, the example gear set 322 of FIG. 3 includes a plurality of planet gears 330, which are mounted to a ring 332, and an outer gear 334 in communication with the example pitch oscillation frequency controller 210. In the illustrated example, the ring 332 is coupled to a non-rotating portion of the control assembly 200, which may be coupled to an airframe, and does not rotate about the main drive shaft 208 in a continuous manner. However, as described below in connection with FIG. 6, the rotational position of the ring 332 relative to a reference can be altered (e.g., by a certain degree) to alter an oscillation phase of the pitch links 206. The stepped gear 324 includes outer teeth 336 that interface with the planet gears 330. The planet gears 330 also interface with internal teeth 338 of the outer gear 334. Thus, as the main drive shaft 208 rotates about its longitudinal axis, the gear set 322 causes the stepped gear 324 and the outer gear 334 to rotate about the longitudinal axis of the main drive shaft 208.

The outer gear 334 is variably slowed by the example pitch oscillation frequency controller 210 to introduce a difference in rotational speed between the stepped gear 324 and the disc-shaped extension 320 of the main drive shaft 208. In the illustrated example of FIG. 3, the pitch oscillation frequency controller 210 is a brake capable of variably slowing down the rotation of the outer gear 334. The example pitch oscillation frequency controller 210 is implemented by any suitable variable braking mechanism such as, for example, a hydraulic re-circulating pump with a needle valve. When the pitch oscillation frequency controller 210 brakes the outer gear 334, the rotational speed of the planet gears 330 and, thus, the stepped gear 324, is reduced. This difference in rotational speed between the stepped gear 324 and the disc-shaped extension 320 caused and controlled by the pitch oscillation frequency controller 210 causes the angled teeth 326 of the stepped gear 324 to rotate the vertical gear 328 around the center axis of the vertical gear. As the vertical gear 328 rotates about its axis, the pitch link 206 oscillates vertically (e.g., toward and away from the stepped gear 324). Thus, the speed of rotation of the vertical gear 328 is controlled by the example pitch oscillation frequency controller 210 and the corresponding amount of braking applied to the outer gear 334. Notably, the example pitch oscillation frequency controller 210 and, more generally, the example pitch input assembly 202, are able to control the oscillation of the pitch links 206 using a variable brake rather than requiring an additional power source and the accompanying costs (e.g., monetary, weight, complexity, etc.).

Figure 6:
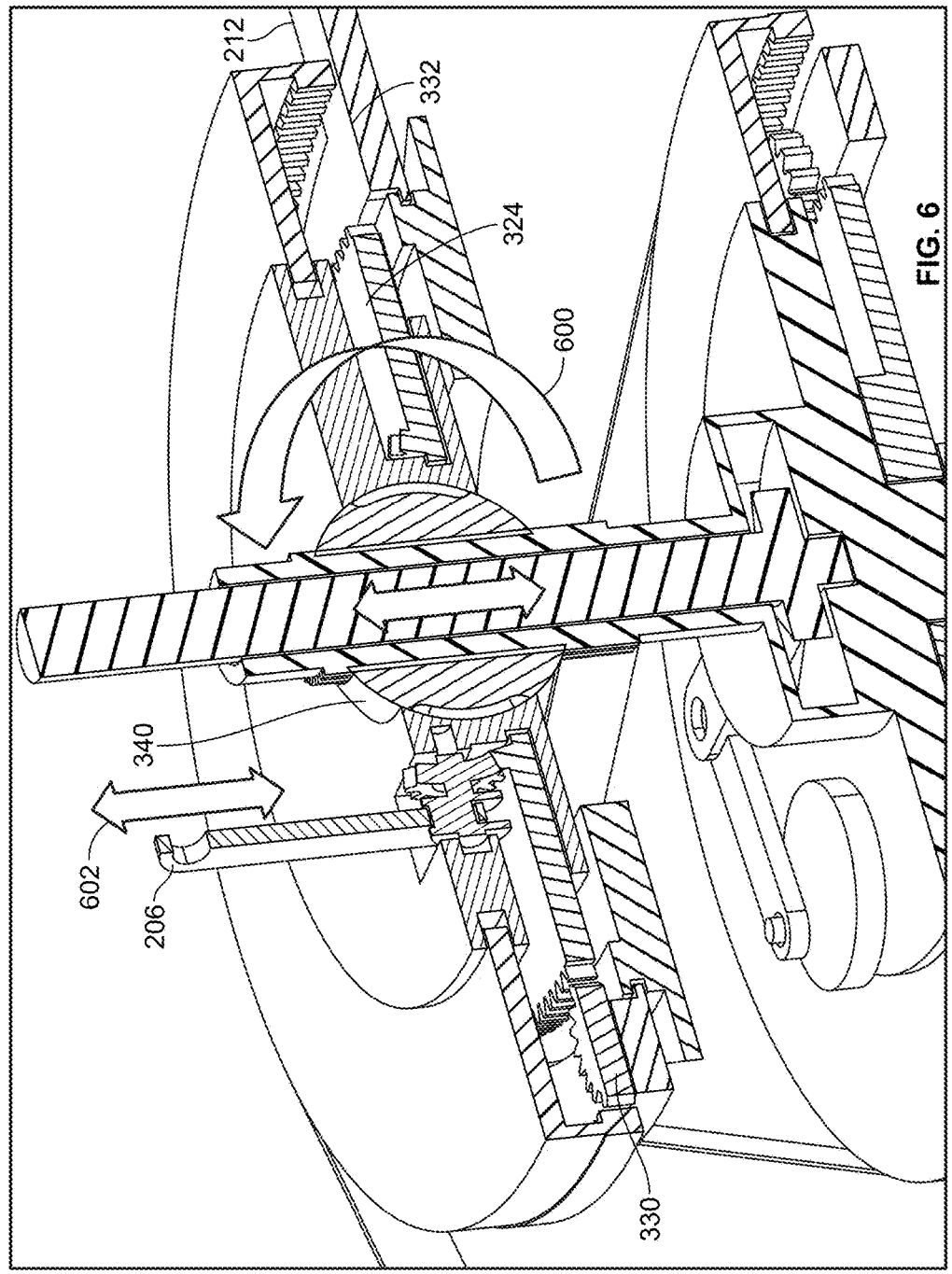
FIG. 6 is a partial sectional view of the pitch input assembly of FIGS. 2 and 3.

Moreover, the example pitch input assembly 202 of FIG. 3 includes a joint 340 that enables the pitch input assembly 202 to move vertically in response to collective and cyclic controls, as described above. Thus, the example pitch input assembly 202 of FIG. 3 provides up and down movement relative to, for example, the fixed swashplate component 205 to respond to collective control inputs and cyclic control inputs, as well as an oscillation of the pitch links 206. As illustrated in FIG. 6, a direction 600 of rotation of the joint 340, as driven by the main drive shaft 208, enables the pitch input assembly 202 to move up and down to provide collective and cyclic control. At a same time, the example pitch input assembly 202 enables the pitch links 206 to oscillate in directions 602 in accordance with the pitch oscillation frequency controller 210. Further, the pitch oscillation phase controller 212 provides control over a phase of the pitch link 206 oscillation. In particular, the example pitch oscillation phase controller 212 rotates the example ring 332 to which the planet gears 330 are mounted. The example pitch oscillation phase controller 212 can be driven by any suitable actuator (e.g., a hydraulic actuator in communication with controls operated by a helicopter operator) to rotate the example ring 332 a desired amount (e.g., degree) to alter the phase of the oscillation of the pitch links 206. As the stepped gear 324 is rotating, a phase of the rotation of the stepped gear 324 can be shifted by rotating the example ring 332 in the direction 600 shown in FIG. 6. For example, as the stepped gear 324 is rotating, the example pitch oscillation phase controller 212 can rotate the ring 332 thirty degrees to offset the phase of the stepped gear 324 and, thus, the oscillation of the pitch links 206 by thirty degrees. The example pitch oscillation phase controller 212 can be rotated back to an original position to eliminate the phase shift.

Figure 7:
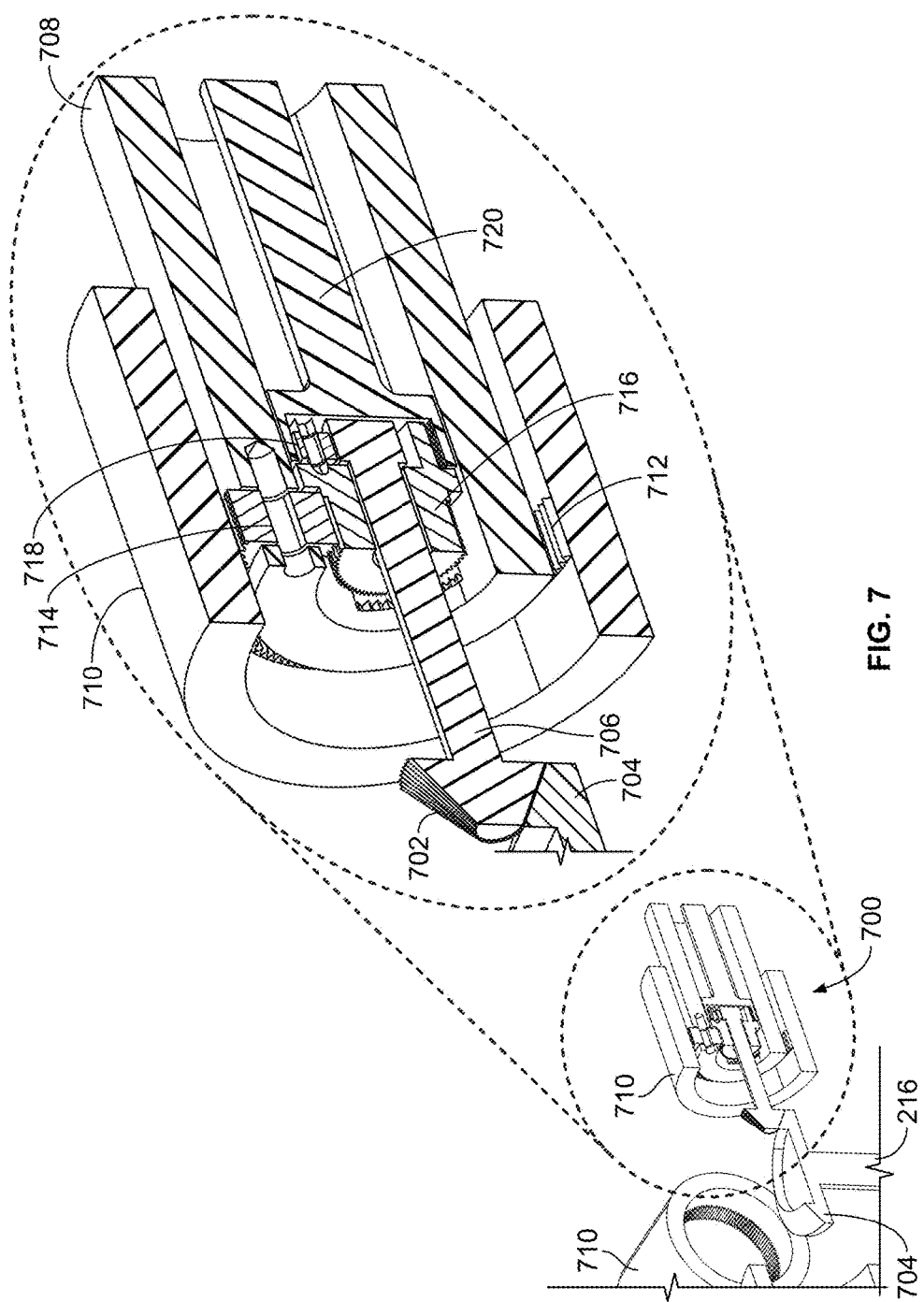
FIG. 7 depicts an example pitch-twitch mixing (PTM) assembly constructed in accordance with teachings of this disclosure to receive input from the example drive assembly of FIGS. 2-6.

FIG. 7 illustrates an example pitch-twist mixing (PTM) assembly 700 constructed in accordance with teachings of this disclosure. The example PTM assembly 700 of FIG. 7 receives twist input and pitch input from the example control assembly 200 of FIGS. 2-6 described above. However, additional or alternative sources may supply the example PTM assembly 700 with twist and/or pitch input. To receive input from the example twist input assembly 204 of FIGS. 2-6, the example PTM assembly 700 includes a first bevel gear 702 that interfaces with a second bevel gear 704 extending from the example twist shaft 216 of FIGS. 2-7. FIG. 7 includes a bisected view of the twist shaft 216 and the second bevel gear 704. As described above, the twist shaft 216 rotates about its longitudinal access as the main drive shaft 208 drives a rotation of, for example, helicopter blades. Thus, the twist shaft 216 rotates with the blades. With no twist input, the second bevel gear 704 rotates with the blades along with the first bevel gear (e.g., teeth of the first bevel gear 702 do not progress through the teeth of the second bevel gear 704). Further, as described above, the twist shaft 216 may oscillate or to affect the twist in the blades. Thus, when the twist shaft 216 and, thus, the second bevel gear 704 oscillates, the first bevel gear 702 progresses through teeth of the second bevel gear 704, thereby causing twist input shaft 706 extending from the first bevel gear 702 to rotate about a center axis of the twist input shaft 706. As such, the twist shaft 216, as controlled by the example twist input assembly 204 of FIGS. 2-6, controls a twisting motion of the twist input shaft 706. Put another way, the example twist input shaft 706 represents an extension of the twist shaft 216 in that the first and second bevel gears 702, 704 convert first rotational movement of the twist shaft 216 along a first plane into second rotational movement of the twist input shaft 706 along a second plane substantially perpendicular to the first plane.

To receive input from the pitch input assembly 202 of FIGS. 2-6, the example PTM assembly 700 of FIG. 7 includes a pitch shaft 708 coupled to a corresponding one of the pitch links 206 driven by the example pitch input assembly 202 of FIGS. 2-6. As described above, the example pitch input assembly 202 of FIGS. 2-6 provides collective and cyclic control of the blades. In the illustrated example, one of the pitch links 206 is coupled to the pitch shaft 708 to convert the movements of pitch link 206 to the PTM assembly 700. Thus, as the pitch links 206 move up and down, the example pitch shaft 708 rotates forward (e.g., clockwise) and backward (e.g., counterclockwise) accordingly. The pitch shafts 708 are coupled to the respective blades (e.g., the pitch shaft 708 is attached to a root of the blade) and, thus, rotation of the pitch shafts 708 cause the blades to pitch.

Accordingly, the example PTM assembly 700 of FIG. 7 receives twist and pitch inputs from the control assembly 200 of FIGS. 2-6. As described above, in known systems, pitch of the blades may have an undesirable effect on the twist. The example PTM assembly 700 mitigates or eliminates the undesirable dependency of twist on pitch. In particular, the example PTM assembly 700 of FIG. 7 enables a twist input to be mixed with any pitch variation such that the twist of the blade remains substantially (e.g., within a threshold) constant throughout a pitch variation. Put another way, the example PTM assembly 700 counteracts the potentially undesirable effect of a pitch variation on the twist of a blade.

To do so, the example PTM assembly 700 of FIG. 7 includes a plurality of gears and interfaces that interact such that the blade can be pitched (e.g., forward or rearward) while maintaining constant a position of the twist relative to the pitch. In the example of FIG. 7, a hub 710 concentric with the pitch shaft 708 includes internal teeth 712 that interface with outer teeth of a pitch coupling gear 714. The example pitch coupling gear 714 rides on the pitch shaft 708 and, thus, travels around a longitudinal axis of the pitch shaft 708 when the pitch rotates. Further, as the pitch shaft 708 is pitched (e.g., via a corresponding one of the pitch links 206) relative to the hub 710, the pitch coupling gear 714 rotates around a center axis of the pitch coupling gear 714. In the example of FIG. 7, the outer teeth of the pitch coupling gear 714 also interface with outer teeth of an intermediate twist shaft 716. When the pitch shaft 708 is advanced in a forward direction, the interaction between the pitch coupling gear 714 and the intermediate twist shaft 716 causes the intermediate twist shaft 716 to advance in the forward direction (e.g., the same direction as the pitch shaft 708). Similarly, when the pitch shaft 708 is advanced in a rearward direction, the interaction between the pitch coupling gear 714 and the intermediate twist shaft 716 causes the intermediate twist shaft 716 to advance in the rearward direction (e.g., the same direction as the pitch shaft 708). In some examples, a stepped pitch coupling gear 714 is a stepped gear to attain a 1:1 ratio between the pitch shaft 708 and the intermediate twist shaft 716. While the example of FIG. 7 depicts the single pitch coupling gear 714, additional pitch coupling gear(s) 714 may ride on the pitch shaft 708. In such examples, the additional pitch coupling gear(s) 714 may be distributed along a circumference of the pitch shaft 708 and are structured similarly as the pitch coupling gear 714 shown in FIG. 7. In such examples, the additional pitch coupling gear(s) 714 interface with the intermediate twist shaft 716 in a similar manner as the pitch coupling gear 714 shown in FIG. 7. Accordingly, a relative motion between the pitch shaft 708 and the hub 710 causes the intermediate twist shaft 716 to rotate about its center axis.

In the example of FIG. 7, a decoupling gear 718 rides on the intermediate twist shaft 716. Thus, as the intermediate twist shaft 716 rotates about the longitudinal axis of the twist shaft 716, the example decoupling gear 718 travels around the longitudinal axis of the twist shaft 716. Outer teeth of the example decoupling gear 718 interface with outer teeth of the twist input shaft 706 and inner teeth of a twist output shaft 720. The example twist output shaft 720 rotates at a root of the blade to which the twist output shaft 720 is attached (attachment not shown). An opposite end of the blade is fixed and, thus, cannot twist. Accordingly, as the portion of the twist output shaft 720 at the root of the blade rotates, the blade twists to modify an airfoil of the blade. As described above, a relative motion between the pitch shaft 708 and the hub 710 causes the intermediate twist shaft 716 to rotate about its center axis. In response, the decoupling gear 718 drives twist output shaft 720 via the corresponding interface with the inner teeth of the twist output shaft 720. As such, the twist output shaft 720 is rotated relative to the twist input shaft 706 using the input twist input shaft 706 as an adjustable reference. In other words, when the twist input shaft 706 is static, shear between the hub 710 and the pitch shaft 708 is directly coupled. However, if the twist input shaft 706 is rotated, the reference changes thereby changing a nominal position of the twist output shaft 720. The interaction between the decoupling gear 718 and the twist output shaft is described in additional detail below in connection with FIGS. 11 and 12. While the example of FIG. 7 depicts the single decoupling gear 718, additional decoupling gear(s) 718 may ride on the intermediate twist shaft 716. In such examples, the additional decoupling gear(s) 718 may be distributed along a circumference of the intermediate twist shaft 716 and are structured similarly as the decoupling gear 718 shown in FIG. 7. In such examples, the additional decoupling gear(s) 718 interface with the outer teeth of the twist input shaft 706 and the inner teeth of the twist output shaft 720 in a similar manner as the decoupling gear 718 shown in FIG. 7.

Figure 8:
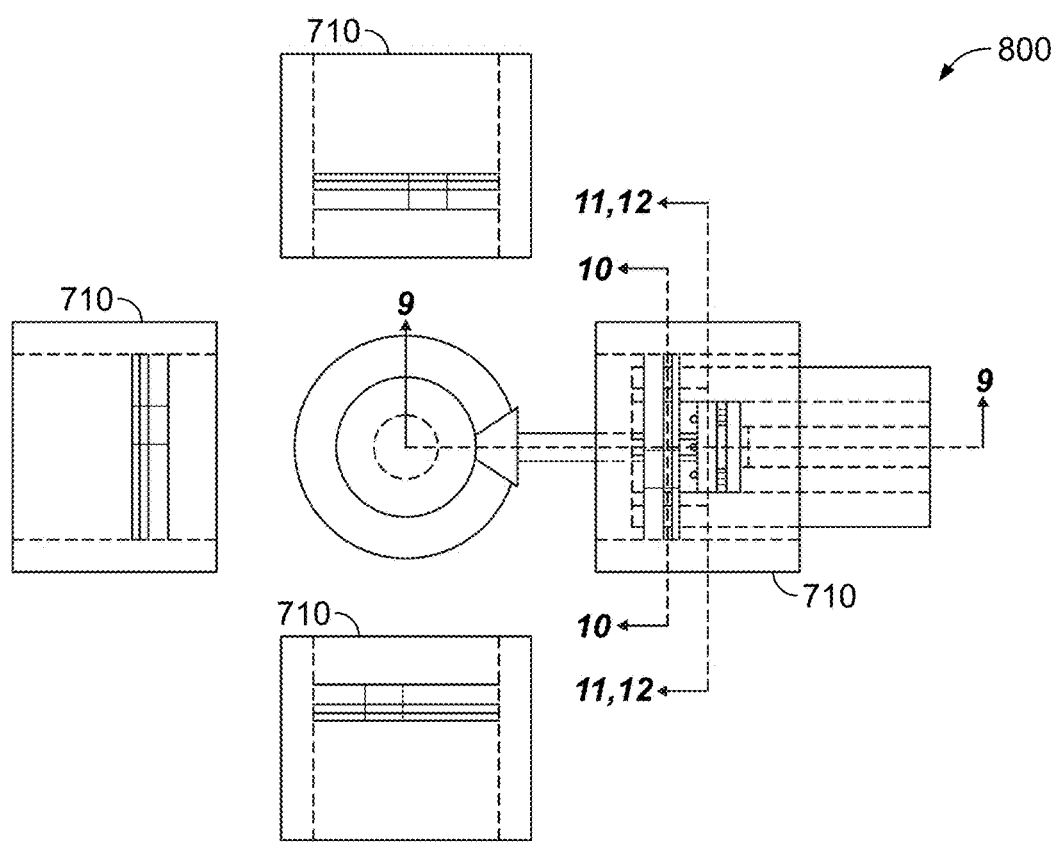
FIG. 8 is a plan view including the example PTM assembly of FIG. 7.
Figure 9:
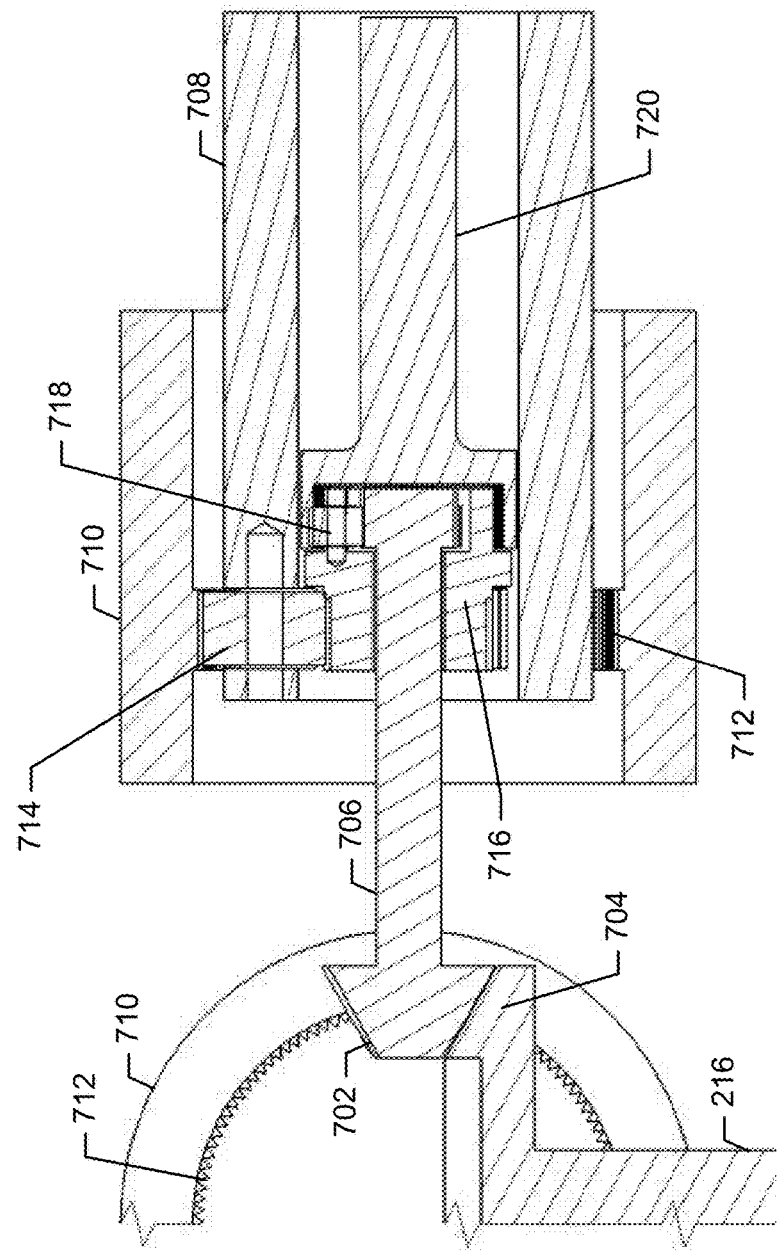
FIG. 9 is a cross-sectional view of the example PTM assembly of FIG. 7 according to the plan view of FIG. 8.
Figure 10:
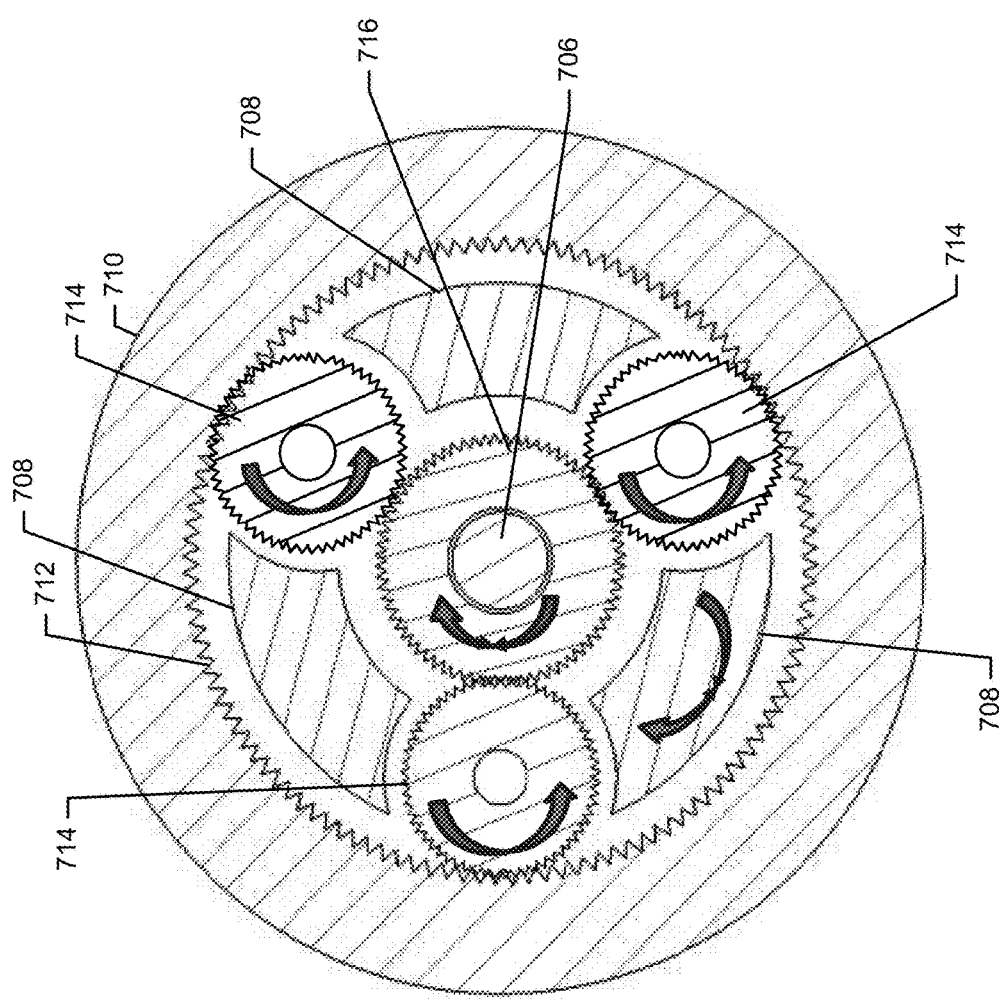
FIG. 10 is a cross-sectional view of the example PTM assembly of FIG. 7 according to the plan view of FIG. 8.
Figure 11:
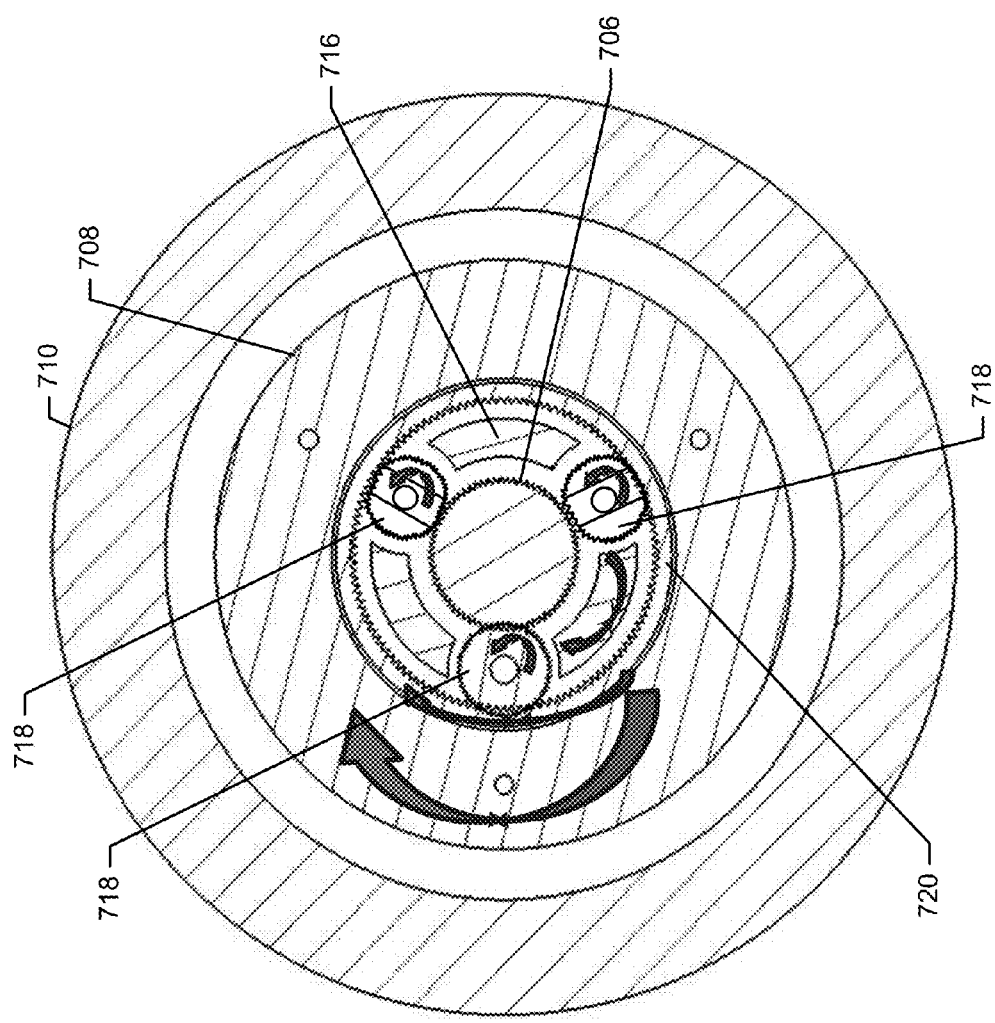
FIG. 11 is a cross-sectional view of the example PTM assembly of FIG. 7 according to the plan view of FIG. 8 with the PTM assembly under a first operational mode.
Figure 12:
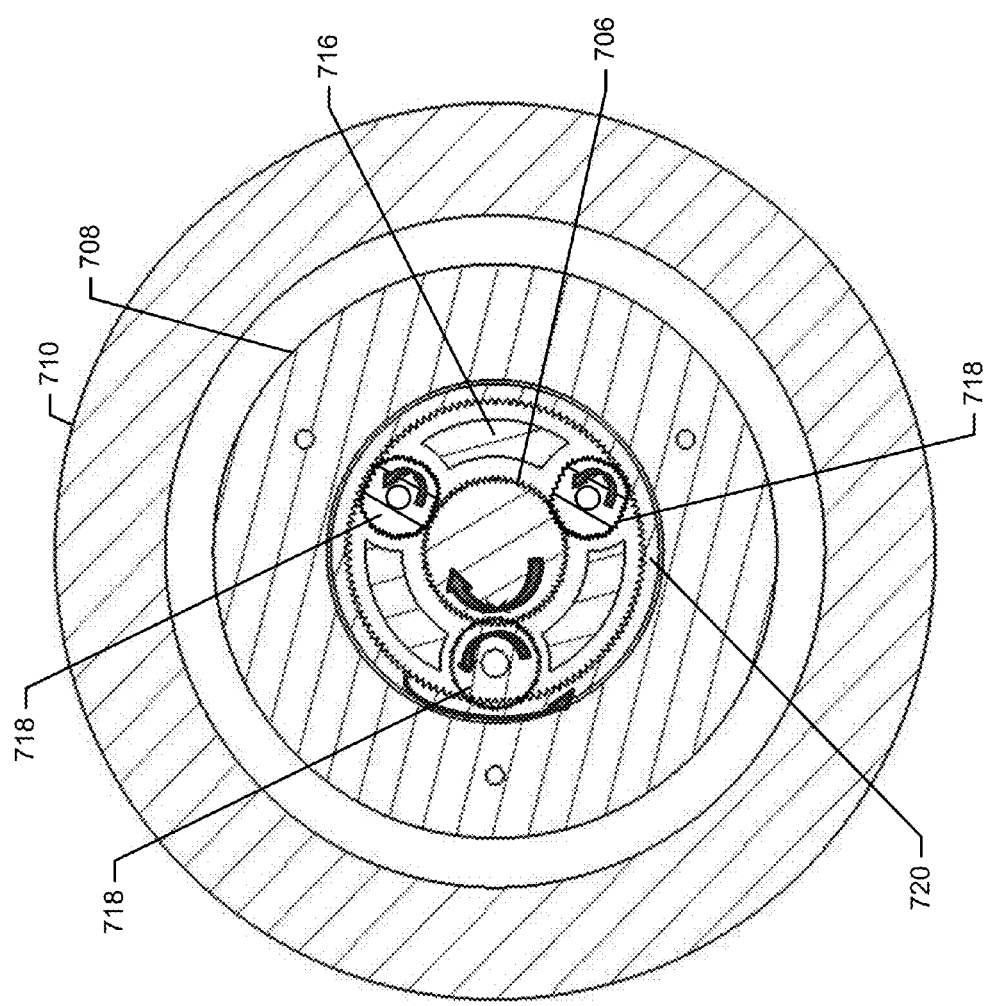
FIG. 12 is the cross-sectional view of FIG. 11 with the PTM assembly under a second operational mode.

FIG. 8 is a plan view 800 including the plurality of hubs 710 of FIG. 7 surrounding the example twist shaft 216. The example of FIG. 8 includes indications of cross-sections that correspond to FIGS. 9-12. A first cross-section is shown in FIG. 9. A second cross-section is shown in FIG. 10. A third cross-section is shown in FIGS. 11 and 12. While only one of the hubs 710 is shown in FIG. 8 with the example PTM assembly 700 implemented, each of the hubs 710 includes an instance of the example PTM assembly 700.

FIG. 9 illustrates certain elements of the PTM assembly 700 from the perspective of a cross-sectional view along a first plane. FIG. 10 illustrates certain elements of the PTM assembly 700 from the perspective of a cross-sectional view along a second plane perpendicular to the first plane of FIG. 9. The example of FIG. 10 illustrates rotational movement of the example elements of the PTM assembly 700. In the example of FIG. 10, the pitch shaft 708 is pitched (e.g., via the pitch links 206 coupled to the pitch shaft 708) clockwise. That is, in the example of FIG. 10, the pitch shaft 708 is rotated about a center axis of the pitch shaft 708 in a clockwise direction. The clockwise rotation of the pitch shaft 708 causes the pitch coupling gears 714 (of which there are three in the example of FIG. 10) to rotate counterclockwise about center axes of the respective pitch coupling gears 714. Notably, the pitch coupling gears 714 also ride on the pitch shaft 708 and, thus, also traverse around the center axis of the pitch shaft 708 in a clockwise direction. As the pitch coupling gears 714 interface with the intermediate twist shaft 716, the counterclockwise rotation of the pitch coupling gears 714 about the center axes of the respective pitch coupling gears 714 causes the intermediate twist shaft 716 to rotate about a center axis of the intermediate twist shaft 716 in a clockwise direction. Accordingly, the intermediate twist shaft 716 and, thus, the twist input shaft 706, rotates about the center axis of the intermediate twist shaft 716 in the same direction as the rotation of the pitch shaft 708. Thus, the example PTM assembly 700 mixes or couples the twist of the blade to the pitch of the blade, thereby enabling the relative twist of the blade to remain constant during pitch variations.

FIG. 11 illustrates certain elements of the example PTM assembly 700 from the perspective of a cross-sectional view along a third plane parallel to the second plane of FIG. 10. The example of FIG. 11 depicts the example decoupling gears 718 (of which there are three in the example of FIG. 11) and the interaction between the decoupling gears 718 with the twist output shaft 720 when the twist input shaft 706 is static (e.g., not rotating) during a pitch variation. With the twist input shaft 706 being static and the pitch shaft 708 rotating in a clockwise direction, the intermediate twist shaft 716 rotates in the same clockwise direction (e.g., via the pitch coupling gear(s) 714 not shown in FIG. 11). With the decoupling gears 718 riding on the intermediate twist shaft 716, the decoupling gears 718 travel around the center axis of the intermediate twist shaft 716 in the clockwise direction and, thus, rotate about their respective center axes in the counterclockwise direction. Because the decoupling gears 718 interface with the inner teeth of the twist output shaft 720, the counterclockwise rotation of the decoupling gears 718 about their respective center axes drives the twist output shaft 720 in the clockwise direction. As such, with the twist input shaft 706 being static and the pitch shaft 708 rotating the clockwise direction, the twist output shaft 720 rotates to maintain its relative rotational position.

FIG. 12 illustrates certain elements of the example PTM assembly 700 from the perspective of a cross-sectional view along the third plane of FIG. 11. The example of FIG. 12 depicts the example decoupling gears 718 (of which there are three in the example of FIG. 11) and the interaction between the decoupling gears 718 with the twist output shaft 720 when the twist input shaft 706 rotates in a clockwise direction and an absence of relative movement between the pitch shaft 708 and the hub 710 (e.g., the pitch shaft 708 is not being rotated about its center axis). As the twist input shaft 706 rotates in the clockwise direction and the pitch shaft 708 is not driven relative to the hub 710 (e.g., not pitched), the decoupling gears 718 rotate about their respective center axes in the counterclockwise direction. The twist output shaft 720 rotates about its center axis accordingly as influenced by the rotation of the twist input shaft 706 and the decoupling gears 718. In some examples, the gear set of the PTM assembly 700 does not convert force in a 1:1 ratio which, in the example of FIG. 12, reduces the input torque required from the twist shaft 216. Instead, a magnitude of rotation of the bevel gear 704 is increased.

Figure 13:
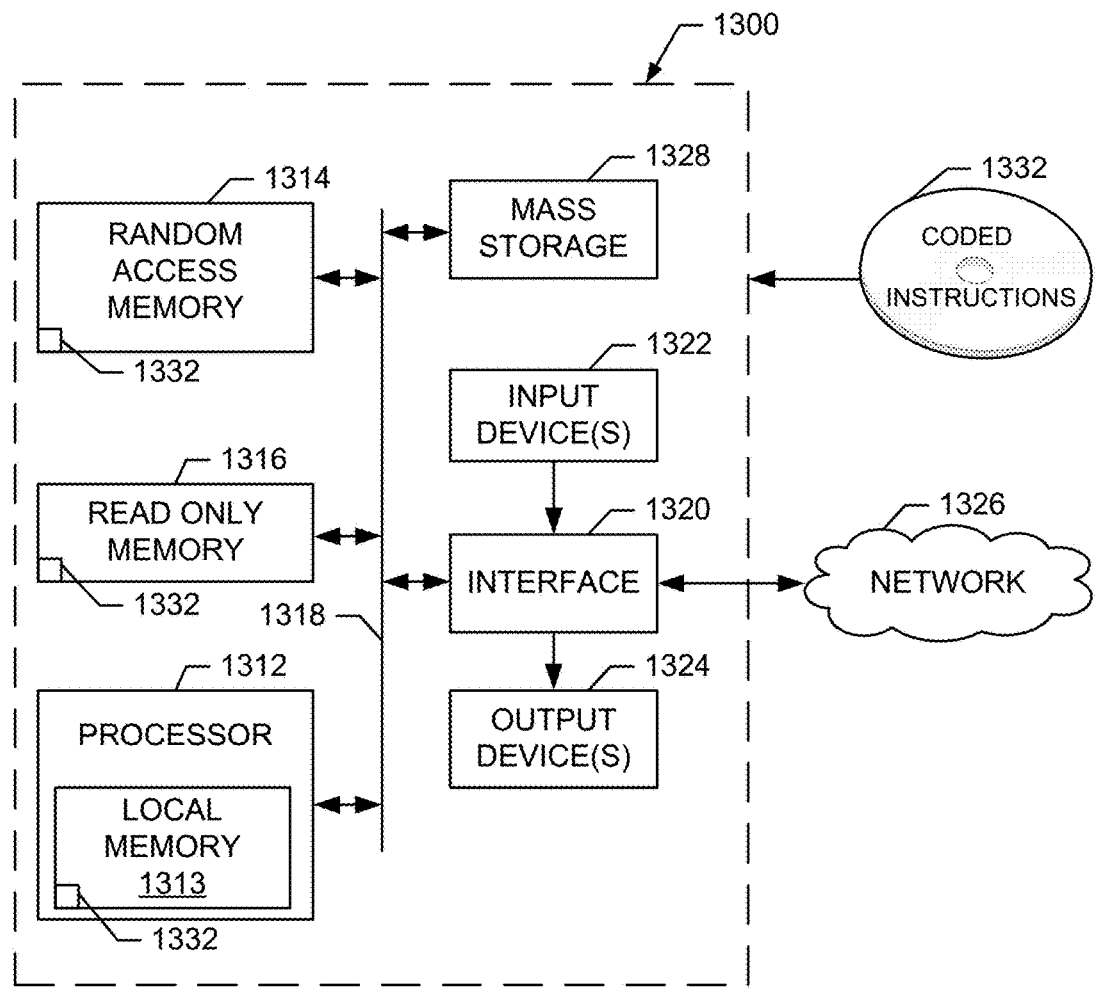
FIG. 13 is a diagram of an example processor platform capable of operating the examples of FIGS. 1-12.

FIG. 13 is a block diagram of an example processor platform 1300 capable of operating the examples disclosed herein. For example, the processor platform 1300 of FIG. 13 may communicate with one or more controllers associated with the example control assembly 200 of FIGS. 2-6 such as, for example, the pitch oscillation frequency controller 210, the pitch oscillation phase controller 212, the twist oscillation frequency controller 218, the twist oscillation phase controller 220, a collective controller associated with movement of the pitch input assembly 202, etc. The processor platform 1300 can be, for example, a computer of a rotorcraft (e.g., the example helicopter 100 of FIG. 1), a remote computer (e.g., a server) in communication with computing equipment of a rotorcraft, a microcontroller implemented in a subassembly or component of a rotorcraft, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touch screen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touch screen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 may be stored in the mass storage device 1328, in the volatile memory 1314, in the non-volatile memory 716, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A control apparatus comprising:
   a drive shaft to drive a rotation of a blade of a rotorcraft;
   a twist shaft to be driven by the drive shaft, the twist shaft to provide a twist input to the blade, the twist shaft being concentric with the drive shaft; and
   gears to convert rotation of the drive shaft into an oscillation of the twist shaft.

2. The apparatus of claim 1, further comprising a brake to create a difference between a first rotational speed of a first one of the gears and a second rotational speed of the drive shaft.

3. The apparatus of claim 2, wherein a magnitude of the difference created by the brake determines a frequency of the oscillation of the twist shaft.

4. The apparatus of claim 1, further comprising a drive to travel about the drive shaft and to rotate about a center of the drive in accordance with a brake applied to a first one of the gears.

5. The apparatus of claim 4, further comprising first and second arms operatively coupling the drive to the twist shaft, wherein rotation of the drive about the center of the drive causes the second arm to oscillate the twist shaft.

6. The apparatus of claim 4, wherein the drive is to ride on a disc-shaped extension of the drive shaft.

7. The apparatus of claim 1, wherein a first one of the gears is in communication with a frequency controller, the frequency controller to slow a rotation of the first one of the gears to cause the oscillation of the twist shaft.

8. The apparatus of claim 1, further comprising a phase controller to alter a phase of the oscillation of the twist shaft.

9. The apparatus of claim 8, wherein the phase controller is to rotate a ring on which one of the gears is mounted.

10. An apparatus, comprising:
a twist input assembly driven by a drive shaft that drives a rotation of blades of a rotorcraft, the twist input assembly comprising:
a twist shaft;
a first gear set driven by the drive shaft; and
a first frequency controller to create a first rotational speed difference between a first gear of the first gear set and the drive shaft, the first rotational speed difference to cause the twist shaft to oscillate; and
a pitch input assembly driven by the drive shaft, the pitch input assembly comprising:
a pitch link in communication with a first one of the blades of the rotorcraft;
a second gear set driven by the drive shaft; and
a second frequency controller to create a second rotational speed difference between a second gear of the second gear set and the drive shaft, the second rotational speed difference to cause the pitch link to oscillate.

11. The apparatus of claim 10, wherein the pitch input assembly is to move toward and away from the twist input assembly in response to collective control input and cyclic control input.

12. The apparatus of claim 10, wherein the twist input assembly further comprises a first phase controller to alter a first phase of a first oscillation of the twist shaft by rotating a third gear of the first gear set.

13. The apparatus of claim 12, wherein the pitch input assembly further comprises a second phase controller to alter a second phase of a second oscillation of the pitch link by rotating a fourth gear of the second gear set.

14. The apparatus of claim 10, wherein the twist shaft is concentric with the drive shaft.

15. The apparatus of claim 10, wherein the twist input assembly further comprises a drive riding on a disc-shaped extension of the drive shaft, the drive to spin about a center axis of the drive in accordance with the first rotational speed difference.

16. The apparatus of claim 15, wherein the twist input assembly further comprises pivotably coupled arms to convert the spin of the drive into an oscillation of the twist shaft.

17. A method comprising:
reducing, by a first amount, a first rotational speed of a first gear in communication with a second gear to cause a twist shaft oscillation having a first frequency, wherein a difference between a second rotational speed of the second gear and a third rotational speed of a drive shaft causes the twist shaft oscillation; and
reducing, by a second amount different than the first amount, the first rotational speed of the first gear to cause the twist shaft oscillation to have a second frequency different than the first frequency.

18. The method of claim 17, wherein reducing the first rotational speed comprises applying a brake to the first gear.

19. The method of claim 17, further comprising rotating an adjustable ring to control a phase of the twist shaft oscillation, wherein a third gear in communication with the first and second gears is coupled to the adjustable ring.

20. The method of claim 17, further comprising reducing, by a third amount, a fourth rotational speed of a third gear in communication with a fourth gear to cause a pitch link oscillation having a third frequency, wherein a difference between a fourth rotational speed of the fourth gear and the third rotational speed of the drive shaft causes the pitch link oscillation.

21. The method of claim 20, further comprising reducing, by a fourth amount different than the third amount, the fourth rotational speed of the third gear to cause the pitch link oscillation to have a fourth frequency different than the third frequency.

* * * * *